US011094293B2

(12) United States Patent
Bian et al.

(10) Patent No.: US 11,094,293 B2
(45) Date of Patent: Aug. 17, 2021

(54) METHOD AND DEVICE FOR ADJUSTING DISPLAY BRIGHTNESS

(71) Applicant: Shanghai Tianma AM-OLED Co., Ltd., Shanghai (CN)

(72) Inventors: Qing Bian, Shanghai (CN); Bojia LV, Shanghai (CN); Xiangzi Kong, Shanghai (CN)

(73) Assignee: Shanghai Tianma AM-OLED Co., Ltd., Shanghai (CN)

( * ) Notice: Subject to any disclaimer, the term of this patent is extended or adjusted under 35 U.S.C. 154(b) by 0 days.

(21) Appl. No.: 16/842,640

(22) Filed: Apr. 7, 2020

(65) Prior Publication Data

US 2021/0166655 A1 Jun. 3, 2021

(30) Foreign Application Priority Data

Nov. 29, 2019 (CN) ........................ 201911204868.2

(51) Int. Cl.
*G09G 5/06* (2006.01)
*G09G 5/10* (2006.01)
*H04N 1/60* (2006.01)
*H04N 5/57* (2006.01)
*H04N 9/64* (2006.01)

(52) U.S. Cl.
CPC ....... *G09G 5/10* (2013.01); *G09G 2320/0626* (2013.01)

(58) Field of Classification Search
CPC combination set(s) only.
See application file for complete search history.

(56) References Cited

U.S. PATENT DOCUMENTS

2010/0053222 A1* 3/2010 Kerofsky ............ G09G 3/3406 345/690
2011/0134344 A1* 6/2011 Marcus ................ H04N 9/3182 348/752
2011/0205397 A1* 8/2011 Hahn ...................... H04N 5/58 348/231.6
2012/0287143 A1* 11/2012 Brown Elliott ...... G09G 3/3607 345/589
2015/0146017 A1* 5/2015 Kim ...................... H04N 17/04 348/189

FOREIGN PATENT DOCUMENTS

CN 107644410 A 1/2018

* cited by examiner

*Primary Examiner* — Wesner Sajous
(74) *Attorney, Agent, or Firm* — Christensen O'Connor Johnson Kindness PLLC

(57) ABSTRACT

Provided is a method for adjusting display brightness, including: generating brightness correction data of each sub-pixel; generating edge correction data of the pixel in an edge display area; setting first codes for first sub-pixels based on the brightness correction data; setting first codes and one second code for second sub-pixels based on the brightness correction data and the edge correction data; storing a mapping table; configuring identification data of the first and second sub-pixels as first codes if the pixel is located in a center display area; configuring identification data of the first sub-pixel as a second code and identification data of the second sub-pixel as the first or second code if the pixel is located in the edge display area; storing the identification data of the first and second sub-pixels; and adjusting the display brightness of the display panel based on the mapping table and the identification data.

15 Claims, 11 Drawing Sheets

| pixel 21 | | | | |
| --- | --- | --- | --- | --- |
| first sub-pixel 211 | | second sub-pixel 212 | | |
| code | brightness correction data | code | brightness correction data | edge correction data |
| 000 | 0 | 000 | 0 | 0 |
| 001 | +1 | 001 | +1 | 0.02 |
| 010 | -1 | 010 | -1 | 0.051 |
| 011 | +2 | 011 | +2 | 0.199 |
| 100 | -2 | 100 | -2 | 0.326 |
| 101 | +3 | 101 | +3 | 0.545 |
| 110 | -3 | 110 | -3 | 0.780 |
| 111 | | 111 | | 1 |

FIG. 6

| pixel 21 | | | | |
| --- | --- | --- | --- | --- |
| first sub-pixel 211 | | second sub-pixel 212 | | |
| code | brightness correction data | code | brightness correction data | edge correction data |
| 0000 | 0 | 0000 | 0 | 0 |
| 0001 | +1 | 0001 | +1 | 0.02 |
| 0010 | -1 | 0010 | -1 | 0.042 |
| …… | …… | …… | …… | …… |
| 0111 | +4 | 0111 | +4 | 0.184 |
| 1000 | -4 | 1000 | -4 | 0.329 |
| …… | …… | …… | …… | …… |
| 1101 | +7 | 1101 | +7 | 0.780 |
| 1110 | -7 | 1110 | -7 | 0.899 |
| 1111 | | 1111 | | 1 |

FIG. 7

| pixel 21 | | | | | |
|---|---|---|---|---|---|
| first sub-pixel 211 | | second sub-pixel 212 | | | |
| code | brightness correction data | code | brightness correction data | edge correction data | |
| | | | | first edge correction data | second edge correction data |
| 000 | 0 | 000 | 0 | 0 | 0 |
| 001 | +1 | 001 | +1 | 0.02 | 0.03 |
| 010 | -1 | 010 | -1 | 0.051 | 0.072 |
| 011 | +2 | 011 | +2 | 0.199 | 0.201 |
| 100 | -2 | 100 | -2 | 0.326 | 0.345 |
| 101 | +3 | 101 | +3 | 0.545 | 0.568 |
| 110 | -3 | 110 | -3 | 0.780 | 0.810 |
| 111 | | 111 | | 1 | 1 |

FIG. 8

| pixel 21 | | | | | |
|---|---|---|---|---|---|
| first sub-pixel 211 | | second sub-pixel 212 | | | |
| code | brightness correction data | code | brightness correction data | edge correction data | |
| | | | | first edge correction data | second edge correction data |
| 0000 | 0 | 0000 | 0 | 0 | 0 |
| 0001 | +1 | 0001 | +1 | 0.02 | 0.03 |
| 0010 | -1 | 0010 | -1 | 0.042 | 0.046 |
| …… | …… | …… | …… | …… | …… |
| 0111 | +4 | 0111 | +4 | 0.184 | 0.193 |
| 1000 | -4 | 1000 | -4 | 0.329 | 0.346 |
| …… | …… | …… | …… | …… | …… |
| 1101 | +7 | 1101 | +7 | 0.780 | 0.79 |
| 1110 | -7 | 1110 | -7 | 0.899 | 0.915 |
| 1111 | | 1111 | | 1 | 1 |

FIG. 9

| pixel 21 | | | | | | | |
|---|---|---|---|---|---|---|---|
| first sub-pixel 211 | | second sub-pixel 212 | | | third sub-pixel 213 | | |
| code | brightness correction data | code | brightness correction data | edge correction data | code | brightness correction data | edge correction data |
| 000 | 0 | 000 | 0 | 0 | 000 | 0 | 0.329 |
| 001 | +1 | 001 | +1 | 0.02 | 001 | +1 | 0.416 |
| 010 | -1 | 010 | -1 | 0.039 | 010 | -1 | 0.545 |
| 011 | +2 | 011 | +2 | 0.045 | 011 | +2 | 0.603 |
| 100 | -2 | 100 | -2 | 0.051 | 100 | -2 | 0.690 |
| 101 | +3 | 101 | +3 | 0.092 | 101 | +3 | 0.780 |
| 110 | -3 | 110 | -3 | 0.184 | 110 | -3 | 0.899 |
| 111 | | 111 | | | 111 | | 1 |

FIG. 12

| pixel 21 | | | | | | | |
|---|---|---|---|---|---|---|---|
| first sub-pixel 211 | | second sub-pixel 212 | | | third sub-pixel 213 | | |
| code | brightness correction data | code | brightness correction data | edge correction data | code | brightness correction data | edge correction data |
| 000 | 0 | 000 | 0 | 0/0/0 | 000 | 0 | 0.319/ 0.325/ 0.329 |
| 001 | +1 | 001 | +1 | 0.01/ 0.015/ 0.02 | 001 | +1 | 0.407/ 0.411/ 0.416 |
| 010 | -1 | 010 | -1 | 0.035/ 0.037/ 0.039 | 010 | -1 | 0.532/ 0.541/ 0.549 |
| 011 | +2 | 011 | +2 | 0.040/ 0.042/ 0.045 | 011 | +2 | 0.598/ 0.603/ 0.609 |
| 100 | -2 | 100 | -2 | 0.049/ 0.051/ 0.054 | 100 | -2 | 0.677/ 0.685/ 0.690 |
| 101 | +3 | 101 | +3 | 0.088/ 0.092/ 0.096 | 101 | +3 | 0.765/ 0.773/ 0.780 |
| 110 | -3 | 110 | -3 | 0.184/ 0.188/ 0.193 | 110 | -3 | 0.879/ 0.885/ 0.899 |
| 111 | | 111 | | | 111 | | 1/1/1 |

FIG. 13

METHOD AND DEVICE FOR ADJUSTING DISPLAY BRIGHTNESS

CROSS-REFERENCE TO RELATED APPLICATIONS

The present application claims the benefit of priority to Chinese Patent Application No. 201911204868.2, filed on Nov. 29, 2019, the content of which is incorporated herein by reference in its entirety.

TECHNICAL FIELD

The present disclosure relates to the field of display technologies, and in particular, to a method and a device for adjusting a display brightness.

BACKGROUND

In the related art, correction data and identification data of pixels are written before delivery of a display panel, the correction data and identification data of the pixels are used to adjust brightness after the delivery of the display panel. The identification data indicates whether the correction data is configured to eliminate display defects or edge sawteeth. However, a data amount of correction data and identification data of all pixels occupies too much storage space in the display panel.

SUMMARY

In order to solve the above technical problems, the present disclosure provides a method and a device for adjusting a display brightness.

In a first aspect, the present disclosure provides a method for adjusting a display brightness, including: for each pixel in a display panel: generating brightness correction data of each sub-pixel, including a first sub-pixel and a second sub-pixel; generating edge correction data of the pixel if the pixel is located in an edge display area; setting a plurality of first codes for the first sub-pixel of the pixel based on the brightness correction data; setting a plurality of first codes and one second code for the second sub-pixel of the pixel based on the brightness correction data and the edge correction data; storing a mapping table including the brightness correction data, the edge correction data, the plurality of first codes, and the second code; configuring identification data of the first sub-pixel of the pixel and identification data of the second sub-pixel of the pixel as first codes if the pixel is located in a center display area; configuring identification data of the first sub-pixel of the pixel as a second code and identification data of the second sub-pixel of the pixel as a first code or a second code if the pixel is located in the edge display area; storing the identification data of the first sub-pixel and the identification data of the second sub-pixel of each pixel in the display panel; and adjusting the display brightness of the display panel based on the mapping table and the identification data.

In a second aspect, based on the same inventive idea, the present disclosure provides a device for adjusting a display brightness, including: a generation module configured to generate brightness correction data of each sub-pixel of each pixel in a display panel, and to generate edge correction data of the pixel in an edge display area; a setting module configured to set a plurality of first codes for first sub-pixels of each pixel based on the brightness correction data, and to set a plurality of first codes and one second code for second sub-pixels of each pixel based on the brightness correction data and the edge correction data; a storage module configured to store a mapping table including the brightness correction data, the edge correction data, the plurality of first codes, and the second code, for each pixel; an identification module configured to configure identification data of the first sub-pixel of each pixel and identification data of the second sub-pixel of each pixel as the plurality of first codes if the pixel is located in a center display area, and to configure identification data of the first sub-pixel of each pixel as a second code and identification data of the second sub-pixel of each pixel as a first code of the plurality of first codes or the second code if the pixel is located in the edge display area, wherein the storage module is configured to store the identification data of the first sub-pixel and the identification data of the second sub-pixel of each pixel in the display panel; and an adjustment module configured to adjust the display brightness of the display panel based on the mapping table and the identification data.

In the present disclosure, the method for adjusting display brightness includes: storing the identification data of the first sub-pixel and the identification data of the second sub-pixel of each pixel. In the storage medium of the display panel, the identification data of the first sub-pixel and the identification data of the second sub-pixel of each pixel share the same code. The identification data of the first sub-pixel of a pixel may be a first code, and meanwhile, the identification data of the second sub-pixel of this pixel may also be a first code. In this case, the identification data of the first sub-pixel and the identification data of the second sub-pixel reflect respective brightness correction data. In addition, the identification data of the first sub-pixel of a pixel may be the second code, and meanwhile, the identification data of the second sub-pixel of this pixel may be a first code or the second code. In this case, the identification data of the first sub-pixel represents that the identification data of the second sub-pixel reflects the edge correction data of this pixel. Therefore, the identification data of the first sub-pixel and the identification data of the second sub-pixel of a pixel can clearly reflect respective brightness correction data or the edge correction data of the pixel. It is not necessary to additionally indicate the meaning of the identification data of the first sub-pixel and the identification data of the second sub-pixel. With the identification data of the first sub-pixel and the identification data of the second sub-pixel of such a pixel, the storage space of the display panel can be saved.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are non-limiting representative embodiments of the present disclosure.

FIG. 6 is a schematic diagram of a mapping table in a method for adjusting display brightness according to an embodiment of the present disclosure;

FIG. 7 is a schematic diagram of a mapping table in another method for adjusting display brightness according to an embodiment of the present disclosure;

FIG. 8 and FIG. 9 are schematic diagrams of a mapping table in another method for adjusting display brightness according to an embodiment of the present disclosure;

FIG. 12 is a schematic diagram of a mapping table in another method for adjusting display brightness according to an embodiment of the present disclosure;

FIG. 13 is a schematic diagram of a mapping table in another method for adjusting display brightness according to an embodiment of the present disclosure.

DESCRIPTION OF EMBODIMENTS

For better illustrating technical solutions of the present disclosure, embodiments of the present disclosure will be described in detail as follows with reference to the accompanying drawings.

It should be noted that, the described embodiments are non-limiting representative embodiments of the present disclosure, which shall not be interpreted as providing limitations to the present disclosure.

The terms used in the embodiments of the present disclosure are for the purpose of describing particular embodiments but not intended to limit the present disclosure. Unless otherwise noted in the context, the singular form expressions “a”, “an”, “the” and “said” used in the embodiments and appended claims of the present disclosure are also intended to represent plural form expressions thereof.

It should be understood that the term “and/or” used herein is an association relationship describing associated objects, indicating that there may be three relationships, for example, A and/or B may indicate that three cases, i.e., A existing individually, A and B existing simultaneously, B existing individually. In addition, the character “/” herein generally indicates that the related objects before and after the character form an “or” relationship.

It should be understood that although a device may be described using the terms of “first”, “second”, etc., in the embodiments of the present disclosure, the device will not be limited to these terms. These terms are used to distinguish devices from one another. For example, without departing from the scope of the embodiments of the present disclosure, a first device may also be referred to as a second device, and similarly, a second device may also be referred to as a first device.

Embodiments of the present disclosure provide a method and a device for adjusting display brightness.

Figure 1:
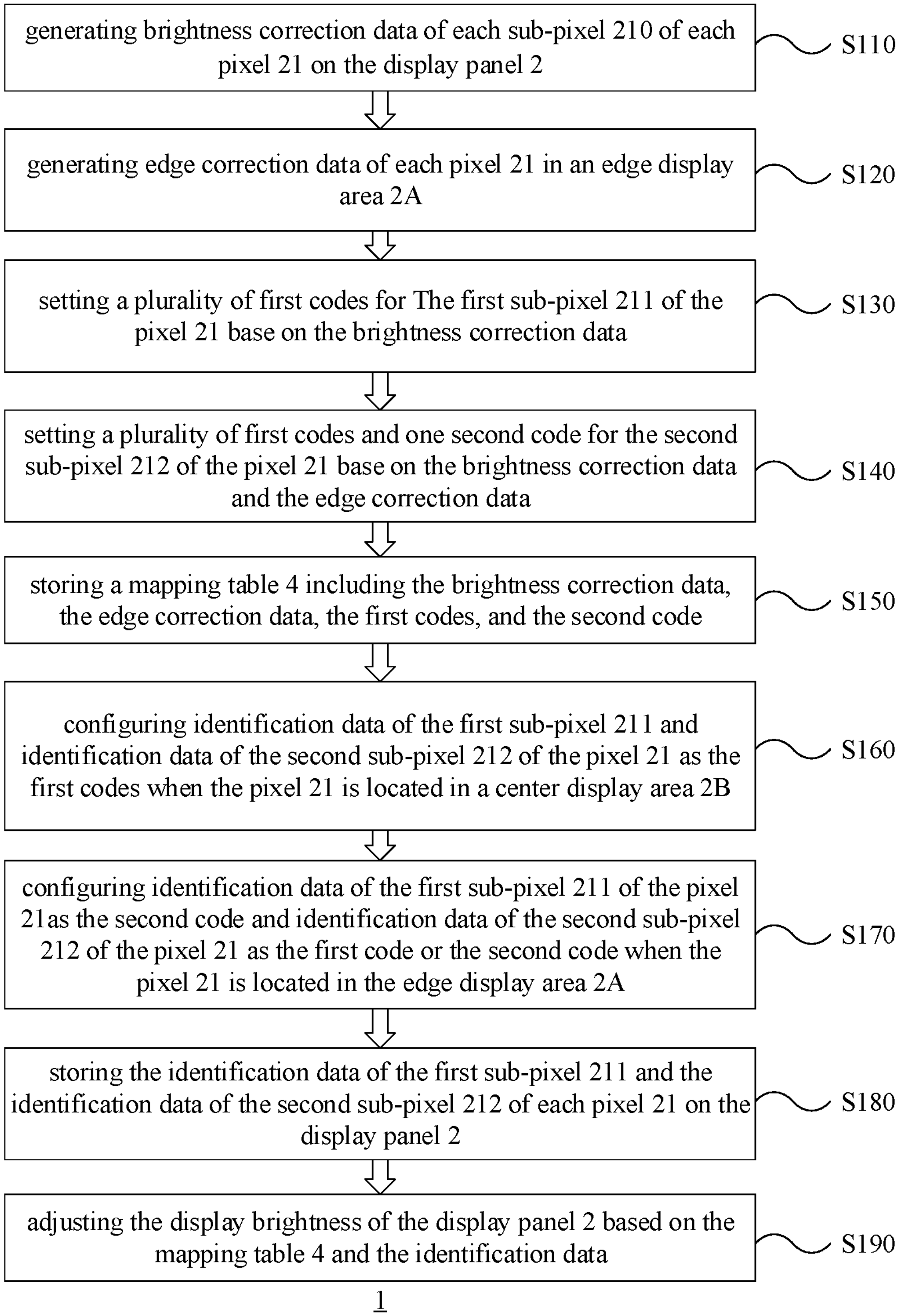
FIG. 1 is a schematic diagram of a method for adjusting display brightness according to an embodiment of the present disclosure.
Figure 2:
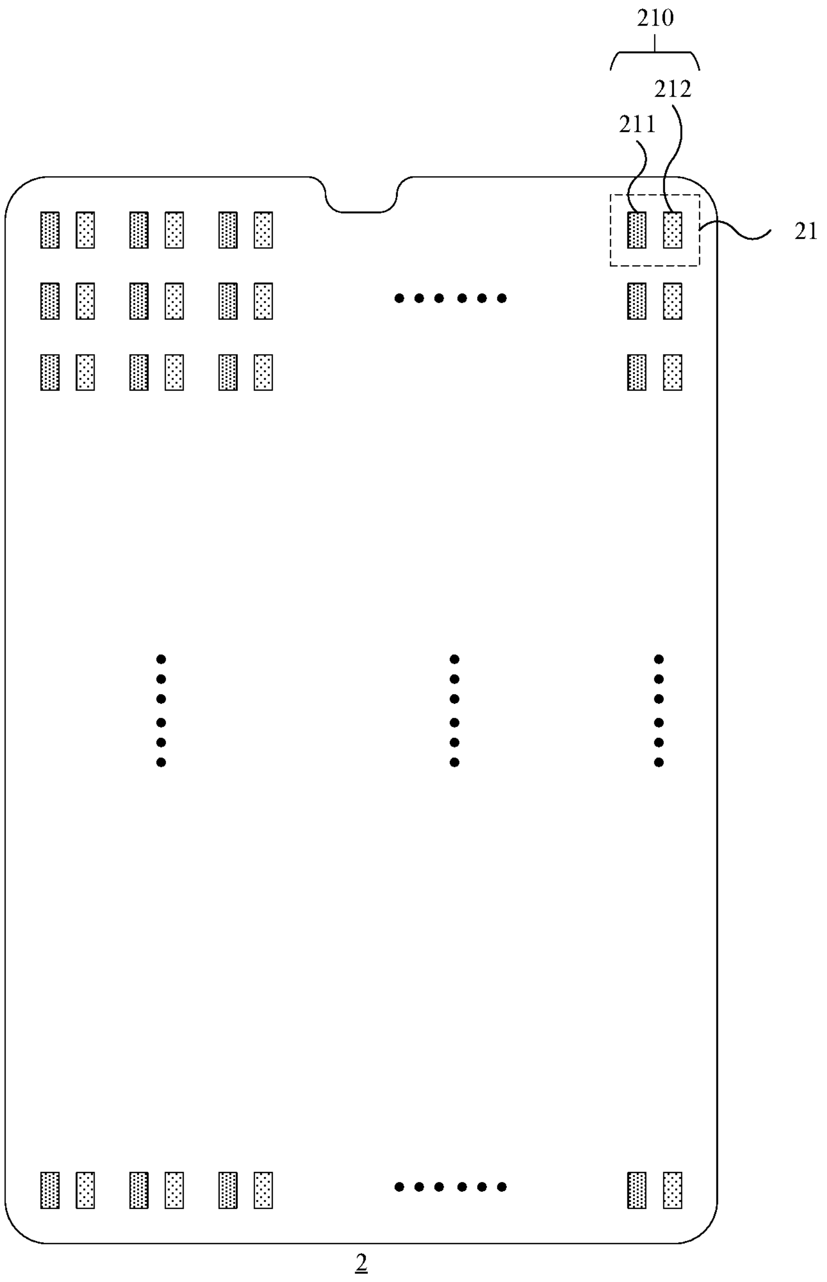
FIG. 2 and FIG. 3 are schematic diagrams of a display panel according to an embodiment of the present disclosure.
Figure 3:
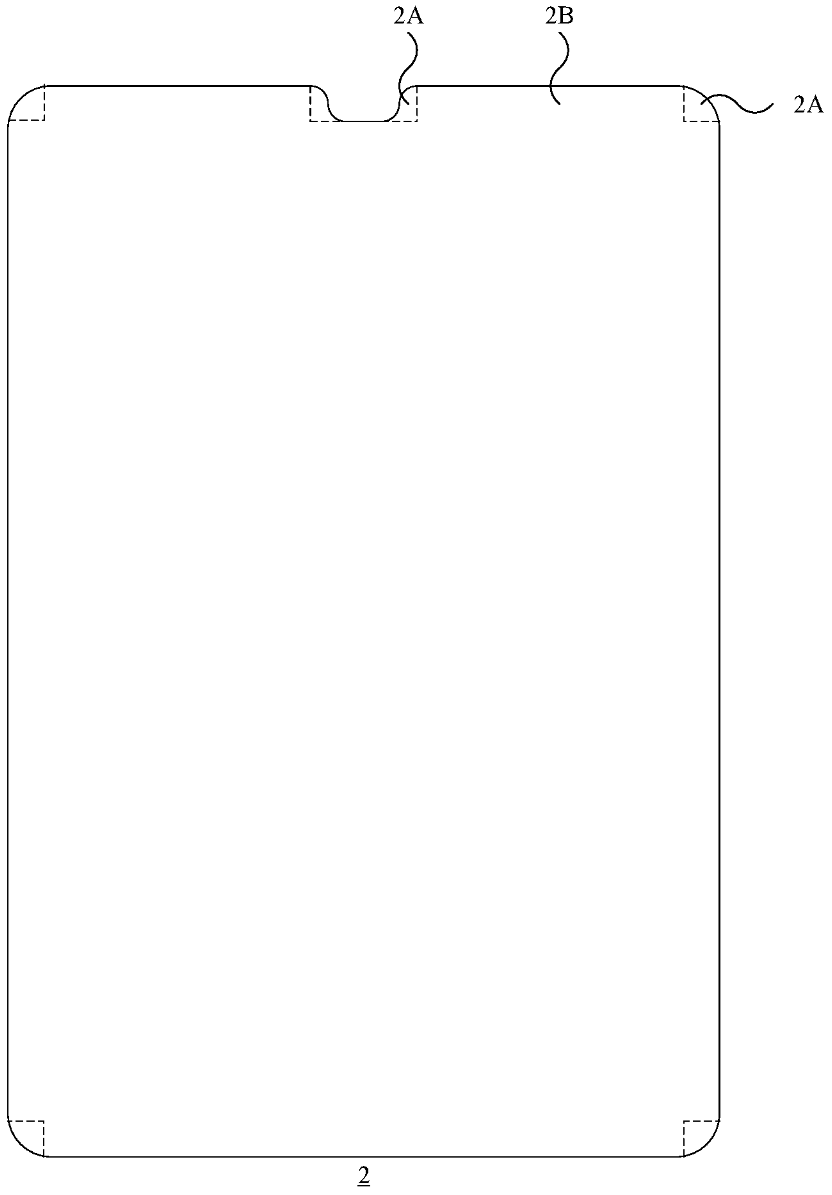
Figure 4:
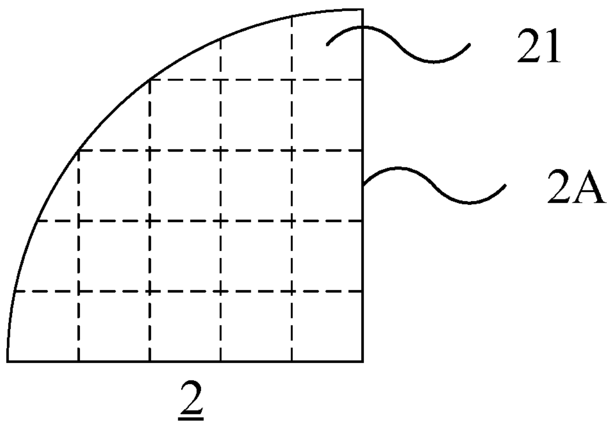
FIG. 4 is a schematic diagram of an edge display area of a display panel according to an embodiment of the present disclosure.
Figure 5:
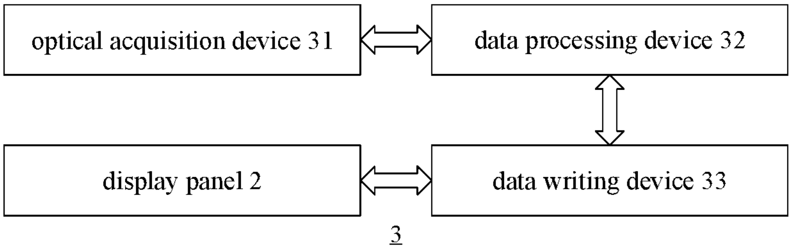
FIG. 5 is a schematic diagram of a system for adjusting display brightness according to an embodiment of the present disclosure.

FIG. 1 is a schematic diagram of a method for adjusting display brightness according to an embodiment of the present disclosure. FIG. 2 and FIG. 3 are schematic diagrams of a display panel according to an embodiment of the present disclosure. FIG. 4 is a schematic diagram of an edge display area of a display panel according to an embodiment of the present disclosure. FIG. 5 is a schematic diagram of a system for adjusting display brightness according to an embodiment of the present disclosure. FIG. 6 is a schematic diagram of a mapping table in a method for adjusting display brightness according to an embodiment of the present disclosure.

As shown in FIG. 1, the method 1 for adjusting display brightness includes steps S110 to S190.

As shown in FIG. 1 to FIG. 6, at a step S110, brightness correction data of each sub-pixel 210 of each pixel 21 in the display panel 2 is generated.

The system 3 for adjusting display brightness includes an optical acquisition device 31, a data processing device 32, and a data writing device 33. The optical acquisition device 31 obtains a display image of the display panel 2. The display panel 2 includes a plurality of pixels 21 arranged in rows and columns. Each pixel 21 includes a plurality of sub-pixels 210. In the data processing device 32, first, display brightness of each sub-pixel 210 of each pixel 21 before adjustment is determined based on the display image of the display panel 2. Then, average brightness of the display panel 2 is determined based on the display image of the display panel 2. The brightness correction data of each sub-pixel 210 of each pixel 21 is generated based on the above-mentioned display brightness before adjustment and the average brightness. The data writing device 33 writes the brightness correction data of each sub-pixel 210 of each pixel 21 into the display panel 2. In the display panel 2, the display brightness of each sub-pixel 210 of each pixel 21 is adjusted based on the brightness correction data. A ratio of display brightness of each sub-pixel 210 of each pixel 21 after adjustment to the average brightness of the display panel 2 is within a range from 0.99 to 1.01. In this way, display defects of the display panel 2 are eliminated.

For example, relative average brightness of the display panel 2 is 100. In the display panel 2, relative display brightness of a sub-pixel 210 of the pixel 21 located in a first row and a first column before adjustment is 98, and for this sub-pixel 210, the brightness correction data is 2 and the relative display brightness after adjustment is 100. Relative display brightness of a sub-pixel 210 of the pixel 21 located in a second row and a second column before adjustment is 103, and for this sub-pixel 210, the brightness correction data is 2 and the relative display brightness after adjustment is 100.

As shown in FIG. 1 to FIG. 6, at a step S120, edge correction data of each pixel 21 in an edge display area 2A is generated.

As shown in FIG. 1 to FIG. 6, the display panel 2 includes the edge display area 2A and a center display area 2B. The display panel 2 further includes straight edges and a special-shaped edge. The special-shaped edge of the display panel 2 is a non-straight edge. The special-shaped edges include rounded edges and recessed edges. The straight edge is located in the center display area 2B. The special-shaped edge is located in the edge display area 2A. In the system 3 for adjusting display brightness, first, the optical acquisition device 31 obtains a display image of the edge display area 2A. Then, the data processing device 32 generates edge correction data of each pixel 21 based on the display image of the edge display area 2A. Then, the data writing device 33 writes the edge correction data of each pixel 21 located in the edge display area 2A into the display panel 2. In the display panel 2, display brightness of each pixel 21 located in the edge display area 2A is adjusted based on the edge correction data. After adjustment, brightness of the edge display area 2A gradually decreases along a direction from a side facing away from the special-shaped edge to a side close to the special-shaped edge. In this way, the edge sawteeth of the edge display area 2A are smoothed.

For example, a plurality of rows of pixels 21 is provided in the edge display area 2A. In the edge display area 2A, first pixels 21 in the second row includes four pixels 21. The four pixels 21 are arranged along the direction from the side of the edge display area 2A facing away from the special-shaped edge to the side of the edge display area 2A close to the special-shaped edge. The relative display brightness of each of the four pixels 21 before adjustment is 100. The edge correction data of each of the four pixel 21 is respectively 1.00, 0.66, 0.33, and 0. The relative display brightness of each of the four pixel 21 after adjustment is respectively 100, 66, 33, and 0.

As shown in FIG. 1 to FIG. 6, at a step S130, a plurality of first codes of first sub-pixels 211 of the pixels 21 are set based on the brightness correction data.

At the step S130, first, non-repeating items of the brightness correction data of the first sub-pixels 211 of all the pixels 21 are selected. Then, the plurality of first codes of the first sub-pixels 211 are set based on the non-repeating terms of the brightness correction data.

For example, the non-repeating terms of the brightness correction data of the first sub-pixels 211 include 0, +1, −1, +2, −2, +3, and −3. The plurality of first codes of the first sub-pixels 211 include 000, 001, 010, 011, 100, 101, and 110. "000 to 110" in the plurality of first codes is set one by one according to "0 to −3" in the brightness correction data. The brightness correction data here is simplified for illustration. A number of binary bits of the actual brightness correction data is greater than 3. Meanwhile, a number of binary bits of the first code is only 3. Therefore, the number of binary bits of the first code is smaller than the number of binary bits of the brightness correction data. Moreover, the system 3 for adjusting display brightness sets a second code of the first sub-pixels 211. For example, the second code of the first sub-pixel 211 includes 111.

As shown in FIG. 1 to FIG. 6, at step S140, a plurality of first codes and one second code of the second sub-pixels 212 of the pixels 21 are set based on the brightness correction data and the edge correction data.

At step S140, first, non-repeating terms of the edge correction data of all pixels 21 and the brightness correction data of the second sub-pixels 212 are selected. Then, the plurality of first codes of the second sub-pixels 212 are set based on the non-repeated terms of the brightness correction data and the edge correction data. Meanwhile, one second code of the second sub-pixels 212 is set based on the edge correction data.

For example, the brightness correction data of the second sub-pixels 212 includes 0, +1, −1, +2, −2, +3, and −3. The edge correction data of the pixels 21 includes 0, 0.02, 0.051, 0.199, 0.326, 0.545, 0.780, and 1. The plurality of first codes of the second sub-pixels 212 includes 000, 001, 010, 011, 100, 101, and 110. The second code of the second sub-pixels 212 includes 111. "000 to 110" in the first codes is set based on "0 to −3" in the brightness correction data and "0 to 0.780" in the edge correction data. "111" in the second code is set based on "1" in the edge correction data. The brightness correction data and the edge correction data here are simplified for illustration. A number of binary bits of the actual brightness correction data and edge correction data is greater than 3. Meanwhile, a number of binary digits of the first codes is only 3. Therefore, the number of binary digits of the first codes is smaller than the number of binary digits of the brightness correction data or the edge correction data.

As shown in FIG. 1 to FIG. 6, at step S150, a mapping table 4 including the brightness correction data, the edge correction data, the first codes, and the second code is stored.

At step S150, the system 3 for adjusting display brightness generates a mapping table 4 and writes the mapping table 4 into the display panel 2. The display panel 2 stores a mapping table 4 and uses the mapping table 4 to adjust display brightness. The mapping table 4 includes the brightness correction data, the edge correction data, the first codes, and the second code.

For example, the mapping table 4 includes a first column and a second column. The first column corresponds to the first sub-pixels 211 of the pixels 21. The second column corresponds to the second sub-pixels 212 of the pixels 21. The first column includes a first sub-column and a second sub-column. The second column includes a third sub-column, a fourth sub-column, and a fifth sub-column. The first sub-column corresponds to the first codes and the second code of the first sub-pixels 211. The second column corresponds to the brightness correction data of the first sub-pixels 211. The third sub-column corresponds to the first codes and the second code of the second sub-pixels 212. The fourth sub-column corresponds to the brightness correction data of the second sub-pixels 212. The fifth sub-column corresponds to the edge correction data of the pixels 21.

At a step S160, when a pixel 21 is located in the center display area 2B, a first code is configured as identification data of the first sub-pixel 211 of this pixel 21 and a first code is configured as identification data of the second sub-pixel 212 of this pixel 21.

At step S160, first, it is determined whether a pixel 21 is located in the center display area 2B. If yes, the first codes are determined based on the brightness correction data of the first sub-pixel 211 and the second sub-pixel 212 of the pixel 21. Then, the first codes of the first sub-pixel 211 and the second sub-pixel 212 of the pixel 21 are configured as identification data. Then, the identification data of the first sub-pixel 211 and the identification data of the second sub-pixel 212 of the pixel 21 are written into the display panel 2.

For example, a pixel 21 is located in the center display area 2B. The brightness correction data of the first sub-pixel 211 and the second sub-pixel 212 of the pixel 21 is respectively +1 and −1. The identification data or first code of the first sub-pixel 211 and the second sub-pixel 212 of this pixel 21 will be 001 and 010.

At step S170, when a pixel 21 is located in the edge display area 2A, the second code is configured as identification data of the first sub-pixel 211 of the pixel 21 and a first code or the second code is configured as identification data of the second sub-pixel 212 of the pixel 21.

At step S170, first, it is determined whether a pixel 21 is located in the edge display area 2A. If yes, the second code of the first sub-pixel 211 of the pixel 21 is configured as the identification data. Meanwhile, the first code or the second code of the second sub-pixel 212 is determined based on the edge correction data of the pixel 21. Then, the first code or the second code of the second sub-pixel 212 of the pixel 21 is configured as the identification data. Then, the identification data of the first sub-pixel 211 and the identification data of the second sub-pixel 212 of the pixel 21 are written into the display panel 2.

For example, a pixel 21 is located in the edge display area 2A. The identification data or the second code of the first sub-pixel 211 of the pixel 21 is 111. In a case, the edge correction data of the pixel 21 is 0.02, and the identification data or the first code of the second sub-pixel 212 of the pixel 21 is 001. In another case, the edge correction data of the pixel 21 is 1, and the identification data or the second code of the second sub-pixel 212 of the pixel 21 is 111.

At step S180, the identification data of the first sub-pixel 211 and the identification data of the second sub-pixel 212 of each pixel 21 in the display panel 2 are stored.

At step S180, the display panel 2 stores the identification data of the first sub-pixel 211 and the identification data of the second sub-pixel 212 of each pixel 21. In a storage medium of the display panel 2, the identification data of the first sub-pixel 211 and the identification data of the second sub-pixel 212 of each pixel 21 share the same code. The identification data of the first sub-pixel 211 of a pixel 21 may be a first code, meanwhile, the identification data of the second sub-pixel 212 of this pixel 21 may be a first code. In this case, the identification data of the first sub-pixel 211 and the identification data of the second sub-pixel 212 reflect respective brightness correction data. In addition, the identification data of the first sub-pixel 211 of a pixel 21 may be the second code, while the identification data of the second sub-pixel 212 of this pixel 21 may be a first code or the second code. In this case, the identification data of the first sub-pixel 211 represents that the identification data of the second sub-pixel 212 reflects the edge correction data of this pixel 21. Therefore, the identification data of the first sub-pixel 211 and the identification data of the second sub-pixel 212 of a pixel 21 can clearly reflect respective brightness correction data or the edge correction data of the pixel 21. It is not necessary to additionally indicate the meaning of the identification data of the first sub-pixel 211 and the identification data of the second sub-pixel 212. With the identification data of the first sub-pixel 211 and the identification data of the second sub-pixel 212 of such a pixel 21, a storage space of the display panel 2 can be saved.

For example, in the storage medium of the display panel 2, the identification data of the first sub-pixel 211 and the identification data of the second sub-pixel 212 of a pixel 21 are respectively 001 and 010. In this case, the identification data of the first sub-pixel 211 and the identification data of the second sub-pixel 212 reflect that their brightness correction data is respectively +1 and −1. The identification data of the first sub-pixel 211 and the identification data of the second sub-pixel 212 of a pixel 21 are respectively 111 and 001. In this case, the identification data of the first sub-pixel 211 and the identification data of the second sub-pixel 212 reflect that the edge correction data of the pixel 21 is 0.02.

At step S190, the display brightness of the display panel 2 is adjusted based on the mapping table 4 and the identification data.

At step S190, the display panel 2 adjusts the display brightness based on the mapping table 4 and the identification data. In an aspect, the identification data of the first sub-pixel 211 of a pixel 21 located in the center display area 2B is a first code, while the identification data of the second sub-pixel 212 of the pixel 21 is a first code. Here, the brightness correction data is determined from the mapping table 4 based on the identification data of the first sub-pixel 211 and the identification data of the second sub-pixel 212. Then, the display brightness is adjusted based on the brightness correction data of the first sub-pixel 211 and the second sub-pixel 212. In another aspect, the identification data of the first sub-pixel 211 of a pixel 21 located in the edge display area 2A is the second code, while the identification data of the second sub-pixel 212 of this pixel 21 is a first code or the second code. Here, the edge correction data of the pixel 21 is determined from the mapping table 4 based on the identification data of the first sub-pixel 211 and the identification data of the second sub-pixel 212. Then, the display brightness is adjusted based on the edge correction data of the pixel 21. In this way, the display defects of the center display area 2B are eliminated, and the edge sawteeth of the edge display area 2A are smoothed.

In this embodiment of the present disclosure, the method 1 for adjusting display brightness includes: storing the identification data of the first sub-pixel 211 and the identification data of the second sub-pixel 212 of each pixel 21. In the storage medium of the display panel 2, the identification data of the first sub-pixel 211 and the identification data of the second sub-pixel 212 of each pixel 21 share the same code. The identification data of the first sub-pixel 211 of a pixel 21 may be a first code, and the identification data of the second sub-pixel 212 of this pixel 21 may be a first code. In this case, the identification data of the first sub-pixel 211 and the identification data of the second sub-pixel 212 reflect respective brightness correction data. In addition, the identification data of the first sub-pixel 211 of a pixel 21 may be the second code, and the identification data of the second sub-pixel 212 of this pixel 21 may be a first code or the second code. In this case, the identification data of the first sub-pixel 211 represents that the identification data of the second sub-pixel 212 reflects the edge correction data of this pixel 21. Therefore, the identification data of the first sub-pixel 211 and the identification data of the second sub-pixel 212 of a pixel 21 can clearly reflect respective brightness correction data or the edge correction data of this pixel 21. It is not necessary to additionally indicate the meaning of the identification data of the first sub-pixel 211 and the identification data of the second sub-pixel 212. With the identification data of the first sub-pixel 211 and the identification data of the second sub-pixel 212 of such a pixel 21, the storage space of the display panel 2 can be saved.

As shown in FIG. 6, one first code of the first sub-pixel 211 corresponds to one piece (e.g., one value) of brightness correction data; one first code of the second sub-pixel 212 corresponds to one piece (e.g., one value) of brightness correction data and one piece (e.g., one value) of edge correction data; and one second code of the second sub-pixel 212 corresponds to one piece (e.g., one value) of edge correction data.

For example, the brightness correction data of the first sub-pixel 211 or the second sub-pixel 212 of a pixel 21 includes 0, +1, −1, +2, −2, +3, and −3. The edge correction data of the pixel 21 includes 0, 0.02, 0.051, 0.199, 0.326, 0.545, 0.780, and 1. The first codes of the first sub-pixel 211 or the second sub-pixel 212 include 000, 001, 010, 011, 100, 101, and 110. The second code of the second sub-pixel 212 includes 111. "000 to 110" in the first codes one-to-one corresponds to "0 to −3" in the brightness correction data. "000 to 110" in the first codes one-to-one corresponds to "0 to 0.780" in the edge correction data. "111" in the second code corresponds to "1" in the edge correction data.

In this embodiment of the present disclosure, in the mapping table 4, the first code of the second sub-pixel 212 of a pixel 21 corresponds to the brightness correction data of the second sub-pixel 212, and the first code of the second sub-pixel 212 of the pixel 21 corresponds to the edge correction data of the pixel 21. Such a set of first codes corresponds to the above two sets of data, i.e., the brightness correction data and the edge correction data. This can avoid that two sets of codes respectively correspond to the brightness correction data and the edge correction data. Therefore, a mapping relationship among the first codes, the brightness correction data, and the edge correction data in the mapping table 4 is simplified. Moreover, in the mapping table 4, the first code of the first sub-pixel 211 is the same as the first code of the second sub-pixel 212. Such a first code corresponds to the brightness correction data of the first sub-pixel 211. Meanwhile, such a first code corresponds to the brightness correction data of the second sub-pixel 212. Such a set of first codes corresponds to the above two sets of brightness correction data. This can avoid that two sets of codes respectively correspond to two sets of brightness correction data. Therefore, a mapping relationship between the first code and the brightness correction data of the first sub-pixel 211 and the second sub-pixel 212 in the mapping table 4 is simplified.

FIG. 7 is a schematic diagram of a mapping table in another method for adjusting display brightness according to an embodiment of the present disclosure.

As shown in FIG. 6 and FIG. 7, the number of bits of the identification data is greater than or equal to 3.

As shown in FIG. 6, in the mapping table 4, the first codes include 000, 001, 010, 011, 100, 101, and 110, and the second code includes 111. The number of bits of one first code or one second code is 3. There are 8 types of first code and second code in total. Such a first code or a second code is configured as the identification data of the pixel 21. The number of bits of one piece of identification data is equal to 3. There are 8 types of identification data in total. As shown in FIG. 7, in the mapping table 4, the first codes include 0000, 0001, 0010, 0111, 1000, 1101, 1110, and so on, and the second code includes 1111. The number of bits of one first code or one second code is 4. There are 16 types of first code and second code in total. Such a first code or a second code is configured as the identification data of the pixel 21. The number of bits of one piece of identification data is equal to 4. There are 16 types of identification data in total. Here, 15 types of identification data correspond to 15 types of brightness correction data, including 0, +1, −1, +4, −4, +7, −7, and so on. The 16 types of identification data correspond to 16 types of edge correction data, including 0, 0.02, 0.042, 0.184, 0.329, 0.780, 0.899, 1, and so on.

In an embodiment of the present disclosure, the number of bits of identification data of each pixel 21 is equal to 3. The number of bits of the identification data is reduced as much as possible. Meanwhile, the number of bits of the identification data is positively related to a data amount of the identification data. Thus, the data amount of the identification data in the display panel 2 is minimized. With such identification data, the storage space of the display panel 2 can be saved.

In another embodiment of the present disclosure, the number of bits of identification data of each pixel 21 is greater than 3. There are more than 8 types of identification data. More types of identification data correspond to more types of first code and second code. More types of first code and second code correspond to more types of brightness correction data and edge correction data. Thus, the display panel 2 can finely adjust the display brightness by using the more types of brightness correction data and edge correction data. Therefore, the display defects of the center display area 2B are further eliminated, and the edge sawteeth of the edge display area 2A are further smoothed.

As shown in FIG. 1 to FIG. 6, adjusting the display brightness of the display panel 2 based on the mapping table 4 and the identification data includes:

reading identification data of the first sub-pixel 211 and identification data of the second sub-pixel 212 of each pixel 21;

searching the mapping table 4 for brightness correction data corresponding to first codes when the identification data of the first sub-pixel 211 of the pixel 21 and the identification data of the second sub-pixel 212 of the pixel 21 are configured as first codes; and adjusting the display brightness by using the brightness correction data of the first sub-pixel 211 and the second sub-pixel 212 of the pixel 21.

For example, identification data of a first sub-pixel 211 of a pixel 21 and identification data of a second sub-pixel 212 of the pixel 21 are 001 and 010, respectively. In the mapping table 4, the identification data 001 and the identification data 010 correspond to brightness correction data +1 and −1. The brightness correction data of the first sub-pixel 211 of the pixel 21 and the brightness correction data of the second sub-pixel 212 of the pixel 21 are respectively +1 and −1. The display brightness of the first sub-pixel 211 of the pixel 21 and the display brightness of the second sub-pixel 212 of the pixel 21 are adjusted based on the brightness correction data +1 and −1.

In this embodiment of the present disclosure, a pixel 21 is located in the center display area 2B. The identification data of the first sub-pixel 211 and the identification data of the second sub-pixel 212 of this pixel 21 are first codes. The identification data of the first sub-pixel 211 of the pixel 21 and the identification data of the second sub-pixel 212 of the pixel 21 reflect respective brightness correction data. The display panel 2 can find the brightness correction data from the mapping table 4 by reading the identification data. Here, the brightness correction data can be found without reading other data. Thus, it is easy to find the brightness correction data of the first sub-pixel 211 of a pixel 21 and the brightness correction data of the second sub-pixel 212 of the pixel 21. Thereafter, the display brightness of the first sub-pixel 211 of the pixel 21 and the second sub-pixel 212 of the pixel 21 are adjusted based on the brightness correction data. Therefore, the display defects of the center display area 2B are eliminated.

As shown in FIG. 1 to FIG. 6, adjusting the display brightness of the display panel 2 based on the mapping table 4 and the identification data includes:

reading identification data of the first sub-pixel 211 of each pixel 21 and identification data of the second sub-pixel 212 of each pixel 21;

searching the mapping table 4 for edge correction data corresponding to the first code or second code when the identification data of the first sub-pixel 211 of the pixel 21 and the identification data of the second sub-pixel 212 of the pixel 21 are configured as the first code or the second code; and adjusting the display brightness of the first sub-pixel 211 and the display brightness of the second sub-pixel 212 of the pixel 21 by using the edge correction data of the pixel 21.

For example, the identification data of the first sub-pixel 211 of a pixel 21 and the identification data of the second sub-pixel 212 of the pixel 21 are 111 and 001, respectively. In the mapping table 4, the identification data 111 indicates that the identification data 001 corresponds to the edge correction data 0.02. The edge correction data of the pixel 21 is 0.02. The display brightness of the first sub-pixel 211 of the pixel 21 and the display brightness of the second sub-pixel 212 of the pixel 21 are adjusted based on the edge correction data 0.02.

In this embodiment of the present disclosure, a pixel 21 is located in the edge display area 2A. The identification data of the first sub-pixel 211 of the pixel 21 is the second code, and the identification data of the second sub-pixel 212 of the pixel 21 is a first code or the second code. The identification data of the first sub-pixel 211 of the pixel 21 and the identification data of the second sub-pixel 212 of the pixel 21 reflect edge correction data of the pixel 21. The display panel 2 can find the edge correction data from the mapping table 4 by reading the identification data. The edge correction data can be found without reading other data. Thus, it is easy to find the edge correction data of the pixel 21. Thereafter, the display brightness of the first sub-pixel 211 of the pixel 21 and the display brightness of the second sub-pixel 212 of the pixel 21 are adjusted based on the edge correction data. Therefore, the edge sawteeth of the edge display area 2A are smoothed.

As shown in FIG. 6 and FIG. 7, the edge correction data of the pixel 21 is recorded in one column of the mapping table 4. The edge correction data here includes 0, 0.02, 0.051, 0.199, 0.326, 0.545, 0.780, and 1. The edge correction data of the pixel 21 is reused as the edge correction data of the first sub-pixel 211 and the edge correction data of the second sub-pixel 212. In the edge display area 2A, for one pixel 21, the display brightness of the first sub-pixel 211 and the display brightness of the second sub-pixel 212 are adjusted based on one piece of edge correction data. Therefore, the data amount of the edge correction data of the pixel 21 in the mapping table 4 is reduced. With such a mapping table 4, the storage space of the display panel 2 can be saved.

FIG. 8 and FIG. 9 are schematic diagrams of a mapping table in another method for adjusting display brightness according to an embodiment of the present disclosure.

As shown in FIG. 8 and FIG. 9, the edge correction data of each pixel 21 includes first edge correction data of the first sub-pixel 211 and second edge correction data of the second sub-pixel 212.

For example, the edge correction data of the pixels 21 is recorded in fifth and sixth columns of the mapping table 4. Here, the first edge correction data of the first sub-pixel 211 of the pixel 21 is recorded in the fifth column of the mapping table 4. Here, the first edge correction data may include 0, 0.02, 0.051, 0.1999, 0.326, 0.545, 0.780, and 1. The first edge correction data may also include 0, 0.02, 0.042, 0.184, 0.329, 0.780, 0.899, 1, and so on. The second edge correction data of the second sub-pixel 212 of this pixel 21 is recorded in the sixth column of the mapping table 4. Here, the second edge correction data may include 0, 0.03, 0.072, 0.201, 0.345, 0.568, 0.810, and 1. The second edge correction data may also include 0, 0.03, 0.046, 0.193, 0.346, 0.79, 0.915, and 1.

In this embodiment of the present disclosure, the edge correction data of each pixel 21 includes the first edge correction data of the first sub-pixel 211 and the second edge correction data of the second sub-pixel 212. In the edge display area 2A, the display brightness of the first sub-pixel 211 of the pixel 21 is adjusted based on the first edge correction data. The display brightness of the second sub-pixel 212 of the pixel 21 is adjusted based on the second edge correction data. Therefore, the display brightness of the first sub-pixel 211 of the pixel 21 and the display brightness of the second sub-pixel 212 of the pixel 21 are finely adjusted based on the two pieces of edge correction data. Therefore, the edge sawteeth of the edge display area 2A are further smoothed.

Figure 10:
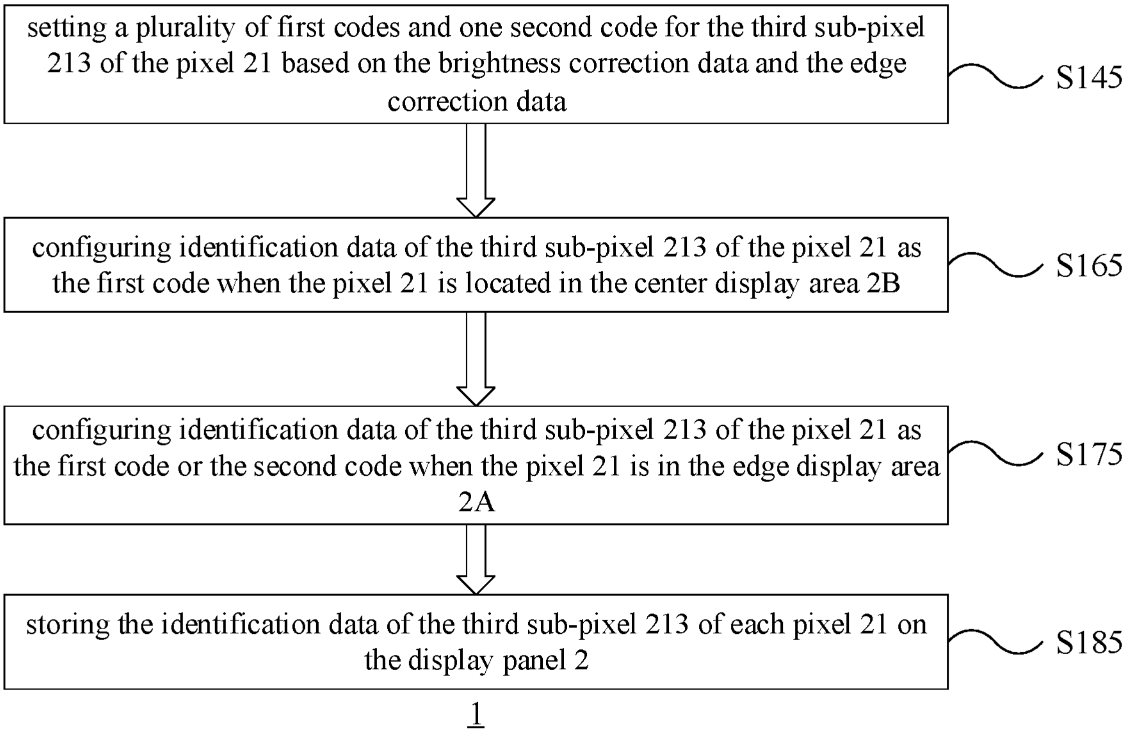
FIG. 10 is a schematic diagram of another method for adjusting display brightness according to an embodiment of the present disclosure.
Figure 11:
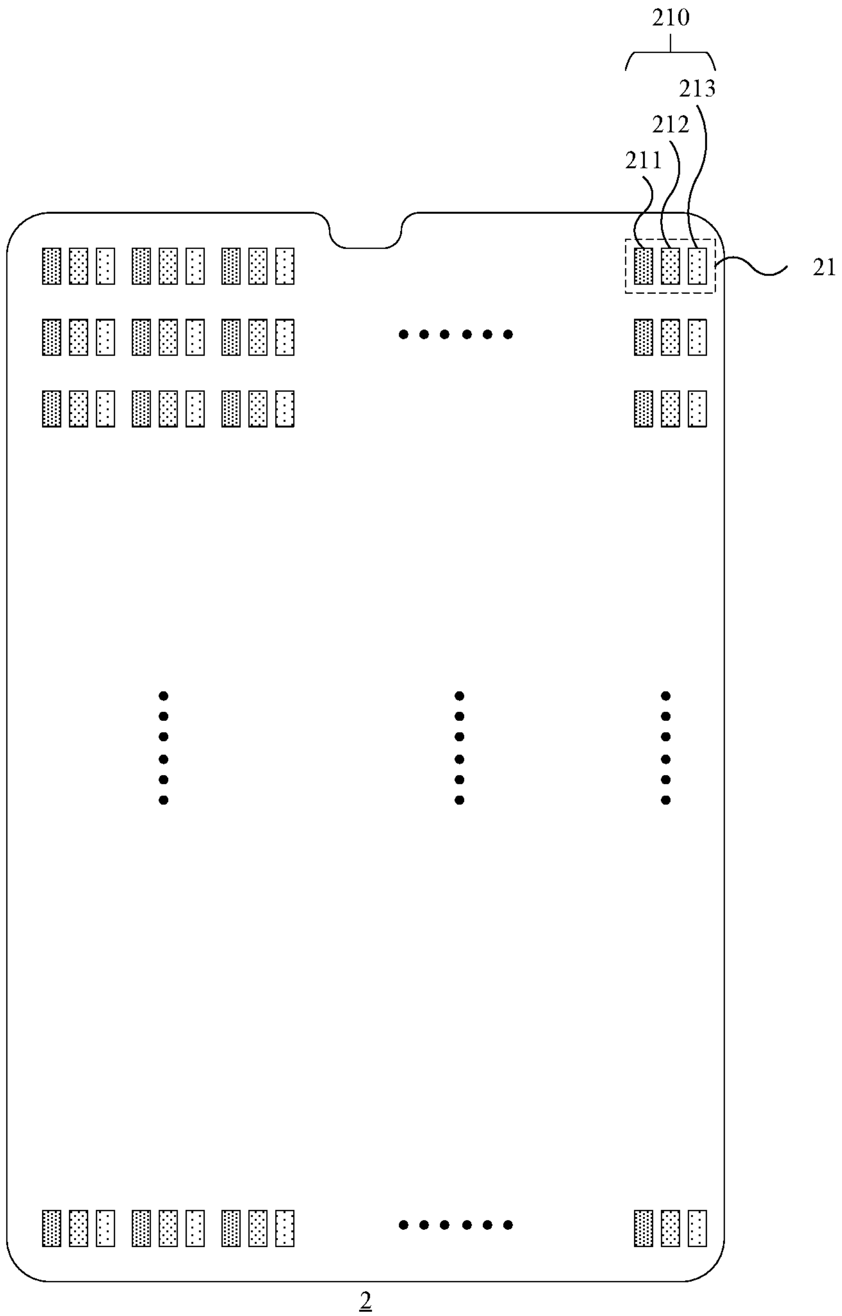
FIG. 11 is a schematic diagram of another display panel according to an embodiment of the present disclosure.

FIG. 10 is a block diagram of another method for adjusting display brightness according to an embodiment of the present disclosure. FIG. 11 is a schematic diagram of another display panel according to an embodiment of the present disclosure. FIG. 12 is a schematic diagram of a mapping table in another method for adjusting display brightness according to an embodiment of the present disclosure.

As shown in FIG. 10 to FIG. 12, the method 1 for adjusting display brightness further includes steps S145 to S185.

At step S145, a plurality of first codes and one second code for the third sub-pixel 213 of the pixel 21 are set based on the brightness correction data and the edge correction data.

For example, the brightness correction data of the third sub-pixel 213 includes 0, +1, −1, +2, −2, +3, and −3. The edge correction data of the pixel 21 may include 0.329, 0.416, 0.545, 0.603, 0.690, 0.780, 0.899, and 1. The first codes of the third sub-pixel 213 include 000, 001, 010, 011, 100, 101, and 110. The second code of the third sub-pixel 213 includes 111. "000 to 110" in the first codes are set based on "0 to −3" in the brightness correction data and "0 to 0.899" in the edge correction data. "111" in the second code is set based on "1" in the edge correction data. Meanwhile, the first codes of the second sub-pixel 212 include 000, 001, 010, 011, 100, 101, and 110. The edge correction data of the pixel 21 may include 0, 0.02, 0.039, 0.045, 0.051, 0.092, and 0.184. "000 to 110" in the first codes are set based on "0 to 0.184" in the edge correction data.

At step S165, when the pixel 21 is located in the center display area 2B, the identification data of the third sub-pixel 213 of the pixel 21 is configured as the first code.

For example, a pixel 21 is located in the center display area 2B. The brightness correction data of the third sub-pixel 213 of the pixel 21 is +1. The identification data or first code of the third sub-pixel 213 of the pixel 21 is 001.

At step S175, when the pixel 21 is located at the edge display area 2A, the identification data of the third sub-pixel 213 of the pixel 21 is configured as the first code or the second code.

For example, a pixel 21 is located in the edge display area 2A. In one case, the edge correction data of the pixel 21 is 0.416. In this case, the identification data or first code of the third sub-pixel 213 of the pixel 21 is 001. In another case, the edge correction data of the pixel 21 is 1. In this case, the identification data or second code of the third sub-pixel 213 of the pixel 21 is 111.

At step S185, the identification data of the third sub-pixel 213 of each pixel 21 in the display panel 2 is stored.

For example, in the storage medium of the display panel 2, the identification data of the third sub-pixel 213 of a pixel 21 is selected from 000, 001, 010, 011, 100, 101, 110, and 111. In this case, the identification data of the third sub-pixel 213 of the pixel 21 reflects the brightness correction data of the third sub-pixel 213 or the edge correction data of the pixel 21.

Here, one first code of the third sub-pixel 213 corresponds to one piece of brightness correction data and one piece of edge correction data.

One second code of the third sub-pixel 213 corresponds to one piece of edge correction data.

For example, "000 to 110" in the first codes of the third sub-pixel 213 correspond to "0 to −3" in its brightness correction data. "000 to 110" in the first codes of the third sub-pixel 213 correspond to "0 to 0.899" in its edge correction data. "111" in the second code of the third sub-pixel 213 corresponds to "1" in its edge correction data.

In this embodiment of the present disclosure, the method 1 for adjusting display brightness includes: storing identification data of the first sub-pixel 211 of each pixel 21, identification data of the second sub-pixel 212 of each pixel 21, and identification data of the third sub-pixel 213 of each pixel 21. In the storage medium of the display panel 2, the identification data of the first sub-pixel 211, the identification data of the second sub-pixel 212, and the identification data of the third sub-pixel 213 of each pixel 21 share the same code. The identification data of the first sub-pixel 211 of a pixel 21 may be the first code, and meanwhile, the identification data of the second sub-pixel 212 and the identification data of the third sub-pixel 213 of the pixel 21 may be the first code. In this case, the identification data of the first sub-pixel 211, the identification data of the second sub-pixel 212, and the identification data of the third sub-pixel 213 reflect respective brightness correction data. In addition, the identification data of the first sub-pixel 211 of a pixel 21 may be the second code, and meanwhile, the identification data of the second sub-pixel 212 of this pixel 21 may be the first code. In this case, the identification data of the second sub-pixel 212 reflects the edge correction data of the pixel 21. In addition, the identification data of the first sub-pixel 211 and the identification data of the second sub-pixel 212 of a pixel 21 may be the second code, and meanwhile, the identification data of the third sub-pixel 213 of this pixel 21 may be the first code or the second code. In this case, the identification data of the third sub-pixel 213 reflects the edge correction data of the pixel 21. Therefore, the identification data of the first sub-pixel 211, the identification data of the second sub-pixel 212, and the identification data of the third sub-pixel 213 of a pixel 21 can clearly reflect respective brightness correction data or the edge correction data of the pixel 21. It is not necessary to additionally indicate the meaning of the identification data of the first sub-pixel 211, the identification data of the second sub-pixel 212, and the identification data of the third sub-pixel 213. Therefore, with the identification data of the first sub-pixel 211, the identification data of the second sub-pixel 212, and the identification data of the third sub-pixel 213 of the pixel 21, the storage space of the display panel 2 can be saved.

As shown in FIG. 10 to FIG. 12, adjusting the display brightness of the display panel 2 based on the mapping table 4 and identification data includes:

reading identification data of the first sub-pixel 211, identification data of the second sub-pixel 212, and identification data of the third sub-pixel 213 of each pixel 21;

searching the mapping table 4 for brightness correction data corresponding to the first codes when identification data of the first sub-pixel 211 of the pixel 21, identification data of the second sub-pixel 212 of the pixel 21, and identification data of the third sub-pixel 213 of the pixel 21 are first codes; and adjusting the display brightness by using the brightness correction data of the first sub-pixel 211, the second sub-pixel 212 and the third sub-pixel 213 of the pixel 21.

For example, the identification data of the first sub-pixel 211, the identification data of the second sub-pixel 212, and the identification data of the third sub-pixel 213 of a pixel 21 are respectively 001, 010, and 011. In the mapping table 4, the identification data 001, 010, and 011 corresponds to brightness correction data +1, −1, and +2. The brightness correction data of the first sub-pixel 211, the brightness correction data of the second sub-pixel 212, and the brightness correction data of the third sub-pixel 213 of the pixel 21 are respectively +1, −1, +2. The display brightness of the first sub-pixel 211, the display brightness of the second sub-pixel 212, and the display brightness of the third sub-pixel 213 of this pixel 21 are adjusted based on the brightness correction data +1, −1, +2.

In this embodiment of the present disclosure, a pixel 21 is located in the center display area 2B. The identification data of the first sub-pixel 211, the identification data of the second sub-pixel 212, and the identification data of the third sub-pixel 213 of the pixel 21 are first codes. The identification data of the first sub-pixel 211, the identification data of the second sub-pixel 212, and the identification data of the third sub-pixel 213 of the pixel 21 reflect respective brightness correction data. The display panel 2 can find the brightness correction data from the mapping table 4 by reading the identification data. The brightness correction data can be found without reading other data. Therefore, it is easy to find the brightness correction data of the first sub-pixel 211, the second sub-pixel 212, and the third sub-pixel 213 of a pixel 21. Thereafter, the display brightness of the first sub-pixel 211, the display brightness of the second sub-pixel 212, and the display brightness of the third sub-pixel 213 of the pixel 21 are adjusted based on the brightness correction data. Therefore, the display defects of the center display area 2B are eliminated.

As shown in FIG. 10 to FIG. 12, adjusting the display brightness of the display panel 2 based on the mapping table 4 and identification data includes:

reading identification data of the first sub-pixel 211, identification data of the second sub-pixel 212, and identification data of the third sub-pixel 213 of each pixel 21;

searching the mapping table 4 for edge correction data corresponding to the first codes when identification data of the first sub-pixel 211 of the pixel 21 is a second code and the identification data of the second sub-pixel 212 of the pixel 21 is a first code; and adjusting the display brightness of the first sub-pixel 211, the display brightness of the second sub-pixel 212 and the display brightness of the third sub-pixel 213 of the pixel 21 by using the edge correction data of the pixel 21.

For example, the identification data of the first sub-pixel 211 and the identification data of the second sub-pixel 212 of a pixel 21 are respectively 111 and 001. In the mapping table 4, the identification data 111 indicates that the identification data 001 corresponds to the edge correction data 0.02. The edge correction data of the pixel 21 is 0.02. The display brightness of the first sub-pixel 211, the display brightness of the second sub-pixel 212, and the display brightness of the third sub-pixel 213 of this pixel 21 are adjusted based on the edge correction data 0.02.

In this embodiment of the present disclosure, a pixel 21 is located in the edge display area 2A. The identification data of the first sub-pixel 211 of the pixel 21 is a second code, and meanwhile, the identification data of the second sub-pixel 212 of the pixel 21 is a first code. The identification data of the first sub-pixel 211 and the identification data of the second sub-pixel 212 of the pixel 21 reflects edge correction data of the pixel 21. The display panel 2 can find the edge correction data from the mapping table 4 by reading the identification data. The edge correction data can be found without reading other data. Therefore, it is easy to find the edge correction data of a pixel 21. Thereafter, the display brightness of the first sub-pixel 211, the display brightness of the second sub-pixel 212 and the display brightness of the third sub-pixel 213 of this pixel 21 are adjusted based on the edge correction data. Therefore, the edge sawteeth of the edge display area 2A are smoothed.

As shown in FIG. 10 to FIG. 12, adjusting the display brightness of the display panel 2 based on the mapping table 4 and identification data includes:

reading identification data of the first sub-pixel 211, identification data of the second sub-pixel 212, and identification data of the third sub-pixel 213 of each pixel 21;

searching the mapping table 4 for edge correction data corresponding to the first code or the second code when identification data of the first sub-pixel 211 of the pixel 21 is a second code, the identification data of the second sub-pixel 212 of the pixel 21 is a second code, and identification data of the third sub-pixel 213 of the pixel 21 is a first code or the second code; and adjusting the display brightness of the first sub-pixel 211, the display brightness of the second sub-pixel 212 and the display brightness of the third sub-pixel 213 of the pixel 21 by using the edge correction data of the pixel 21.

For example, the identification data of the first sub-pixel 211, the identification data of the second sub-pixel 212, and the identification data of the third sub-pixel 213 of a pixel 21 are respectively 111, 111, and 010. In the mapping table 4, the identification data 111, 111 indicates that the identification data 010 corresponds to the edge correction data 0.545. The edge correction data of this pixel 21 is 0.545. The display brightness of the first sub-pixel 211, the display brightness of the second sub-pixel 212, and the display brightness of the third sub-pixel 213 of this pixel 21 are adjusted based on the edge correction data 0.545.

In this embodiment of the present disclosure, a pixel 21 is located in the edge display area 2A. The identification data of the first sub-pixel 211 is a second code and the identification data of the second sub-pixel 212 of this pixel 21 is a second code, and meanwhile, the identification data of the third sub-pixel 213 of this pixel 21 is a first code or a second code. The identification data of the first sub-pixel 211, the identification data of the second sub-pixel 212 and the identification data of the third sub-pixel 213 of the pixel 21 reflect edge correction data of the pixel 21. The display panel 2 can find the edge correction data from the mapping table 4 by reading the identification data. The edge correction data can be found without reading other data. Therefore, it is easy to find the edge correction data of a pixel 21. Thereafter, the display brightness of the first sub-pixel 211, the display brightness of the second sub-pixel 212 and the display brightness of the third sub-pixel 213 of this pixel 21 are adjusted based on the edge correction data. Therefore, the edge sawteeth of the edge display area 2A are smoothed.

As shown in FIG. 12, the edge correction data of the pixel 21 is recorded in a fifth column and an eight column of the mapping table 4. The edge correction data in the fifth column includes 0, 0.02, 0.039, 0.045, 0.051, 0.092, and 0.184. The edge correction data in the eighth column includes 0.329, 0.416, 0.545, 0.603, 0.690, 0.780, 0.899, and 1. The edge correction data of the pixel 21 is reused as the edge correction data of the first sub-pixel 211, the second sub-pixel 212, and the third sub-pixel 213. In the edge display area 2A, the display brightness of the first sub-pixel 211, the display brightness of the second sub-pixel 212, and the display brightness of the third sub-pixel 213 of one pixel 21 are adjusted based on one piece of edge correction data. Therefore, a data amount of the edge correction data of the pixel 21 in the mapping table 4 is reduced. With such a mapping table 4, the storage space of the display panel 2 can be saved.

FIG. 13 is a schematic diagram of a mapping table in another method for adjusting display brightness according to an embodiment of the present disclosure.

As shown in FIG. 13, the edge correction data of each pixel 21 includes first edge correction data of the first sub-pixel 211, second edge correction data of the second sub-pixel 212, and third edge correction data of the third sub-pixel 213.

For example, the edge correction data of the pixel 21 is recorded in fifth to seventh columns and tenth to twelfth columns of the mapping table 4. The first edge correction data of the first sub-pixel 211 of the pixel 21 is recorded in the fifth column of the mapping table 4. The second edge correction data of the second sub-pixel 212 of the pixel 21 is recorded in the sixth column of the mapping table 4. The third edge correction data of the third sub-pixel 213 of the pixel 21 is recorded in the seventh column of the mapping table 4. The first edge correction data of the first sub-pixel 211 of the pixel 21 is recorded in the tenth column of the mapping table 4. The second edge correction data of the second sub-pixel 212 of the pixel 21 is recorded in the eleventh column of the mapping table 4. The third edge correction data of the third sub-pixel 213 of the pixel 21 is recorded in the twelfth column of the mapping table 4.

In this embodiment of the present disclosure, the edge correction data of the pixel 21 includes the first edge correction data of the first sub-pixel 211, the second edge correction data of the second sub-pixel 212, and the third edge correction data of the third sub-pixel 213. In the edge display area 2A, display brightness of the first sub-pixel 211 of the pixel 21 is adjusted based on the first edge correction data, display brightness of the second sub-pixel 212 of the pixel 21 is adjusted based on the second edge correction data, and display brightness of the third sub-pixel 213 of the pixel 21 is adjusted based on the third edge correction data. In this way, the display brightness of the first sub-pixel 211, the display brightness of the second sub-pixel 212, and the display brightness of the third sub-pixel 213 of the pixel 21 are finely adjusted based on the three pieces of edge correction data. Therefore, the edge sawteeth of the edge display area 2A are further smoothed.

As shown in FIGS. 6-9 and FIGS. 12-13, a number of bits of identification data is smaller than a number of bits of brightness correction data and smaller than a number of bits of edge correction data.

In this embodiment of the present disclosure, the display panel 2 stores identification data of all pixels 21. The number of bits of identification data is smaller than the number of bits of brightness correction data and smaller than the number of bits of edge correction data. A data amount of the identification data is reduced as much as possible. Therefore, with the identification data of all pixels 21, the storage space of the display panel 2 can be saved.

As shown in FIGS. 2, 3 and 11, the display panel 2 is a special-shaped display panel 2.

In this embodiment of the present disclosure, the display panel 2 is a special-shaped display panel 2. The special-shaped edge is located in the edge display area 2A. The display brightness of each pixel 21 in the edge display area 2A is adjusted based on the edge correction data. The brightness of the edge display area 2A after adjustment gradually decreases along a direction from a side facing away from the special-shaped edge to a side close to the special-shaped edge. Therefore, the edge sawteeth of the edge display area 2A are smoothed.

Figure 14:
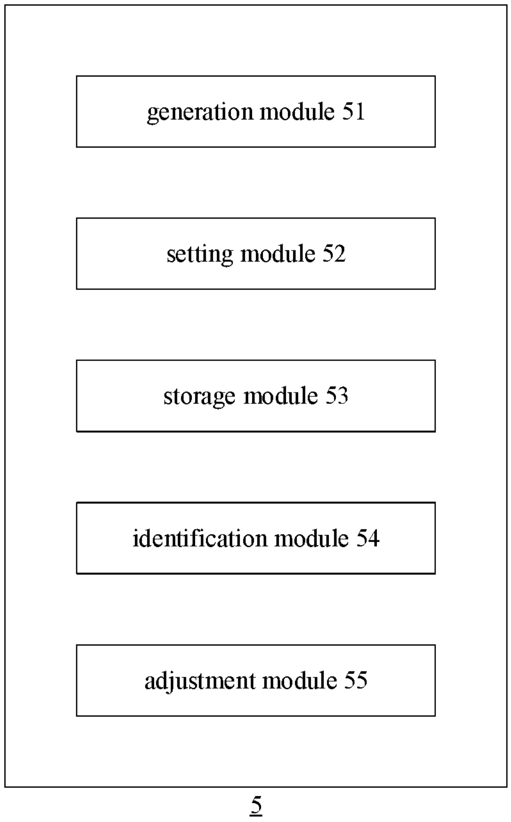
FIG. 14 is a schematic diagram of a device for adjusting display brightness according to an embodiment of the present disclosure.

FIG. 14 is a schematic diagram of a device for adjusting display brightness according to an embodiment of the present disclosure.

As shown in FIG. 1 and FIG. 14, the device 5 for adjusting display brightness includes a generation module 51, a setting module 52, a storage module 53, an identification module 54, and an adjustment module 55. The generation module 51 is configured to generate brightness correction data of each sub-pixel of each pixel 21 in the display panel 2, and generate edge correction data of each pixel 21 in an edge display area 2A. The setting module 52 is configured to set a plurality of first codes of a first sub-pixel 211 of the pixel 21 based on the brightness correction data, and set a plurality of first codes and one second code of a second sub-pixel 212 of the pixel 21 based on the brightness correction data and the edge correction data. The storage module 53 is configured to store a mapping table 4 including the brightness correction data, the edge correction data, the first codes, and the second code. The identification module 54 is configured to, when the pixel 21 is located in the center display area 2B, configured the identification data of the first sub-pixel 211 and the second sub-pixel 212 of the pixel 21 as the first code. The identification module 54 is configured to, when the pixel 21 is located in the edge display area 2A, configure the identification data of the first sub-pixel 211 of the pixel 21 as the second code and the identification data of the second sub-pixel 212 of the pixel 21 as the first code or second code. The storage module 53 is configured to store the identification data of the first sub-pixel 211 and the identification data of the second sub-pixel 212 of each pixel 21 in the display panel 2. The adjustment module 55 is configured to adjust display brightness of the display panel 2 based on the mapping table 4 and the identification data.

In this embodiment of the present disclosure, the device 5 for adjusting display brightness is configured to store the identification data of the first sub-pixel 211 and the identification data of the second sub-pixel 212 of each pixel 21 in the display panel 2 into the display panel 2. In the storage medium of the display panel 2, the identification data of the first sub-pixel 211 and the identification data of the second sub-pixel 212 of each pixel 21 share the same code. The identification data of the first sub-pixel 211 of a pixel 21 may be the first code, and meanwhile, the identification data of the second sub-pixel 212 of this pixel 21 may also be the first code. In this case, the identification data of the first sub-pixel 211 and the identification data of the second sub-pixel 212 reflect respective brightness correction data. In addition, the identification data of the first sub-pixel 211 of a pixel 21 may be the second code, and meanwhile, the identification data of the second sub-pixel 212 of this pixel 21 may be the first code or the second code. In this case, the identification data of the first sub-pixel 211 indicates that the identification data of the second sub-pixel 212 reflects the edge correction data of this pixel 21. Therefore, the identification data of the first sub-pixel 211 and the identification data of the second sub-pixel 212 of a pixel 21 can clearly reflect respective brightness correction data or the edge correction data of the pixel 21. There is no need to additionally indicate the meaning of the identification data of the first sub-pixel 211 and the identification data of the second sub-pixel 212. With the identification data of the first sub-pixel 211 and the identification data of the second sub-pixel 212 of such a pixel 21, the storage space of the display panel 2 can be saved.

As shown in FIG. 1 and FIG. 14, a number of bits of identification data of the device 5 for adjusting display brightness is smaller than a number of bits of the brightness correction data and smaller than a number of bits of the edge correction data.

In this embodiment of the present disclosure, the device 5 for adjusting display brightness is configured to store the identification data of all pixels 21 into the display panel 2. The number of bits of identification data is smaller than the number of bits of the brightness correction data and smaller than the number of bits of the edge correction data. A data amount of the identification data is reduced as much as possible. Therefore, with the identification data of all pixels 21, the storage space of the display panel 2 can be saved.

The above-described embodiments are representative embodiments of the present disclosure and are not intended to limit the present disclosure. The present disclosure includes additional embodiments, including those having any combination of one or more features of the embodiments described herein. Any modifications, equivalent substitutions and improvements made within the principle of the present disclosure shall fall into the protection scope of the present disclosure.

What is claimed is:

1. A method for adjusting display brightness, comprising: for each pixel in a display panel:

generating brightness correction data of each sub-pixel, including a first sub-pixel and a second sub-pixel;

generating edge correction data of the pixel if the pixel is located in an edge display area;

setting a plurality of first codes for the first sub-pixel of the pixel based on the brightness correction data;

setting a plurality of first codes and one second code for the second sub-pixel of the pixel based on the brightness correction data and the edge correction data;

storing a mapping table comprising the brightness correction data, the edge correction data, the plurality of first codes, and the second code;

configuring identification data of the first sub-pixel of the pixel and identification data of the second sub-pixel of the pixel as first codes if the pixel is located in a center display area;

configuring identification data of the first sub-pixel of the pixel as a second code and identification data of the second sub-pixel of the pixel as a first code or a second code if the pixel is located in the edge display area;

storing the identification data of the first sub-pixel and the identification data of the second sub-pixel of each pixel in the display panel; and adjusting the display brightness of the display panel based on the mapping table and the identification data.

2. The method for adjusting the display brightness according to claim 1, wherein one first code of the first sub-pixel corresponds to one piece of brightness correction data;

one first code of the second sub-pixel corresponds to one piece of brightness correction data and one piece of edge correction data; and one second code of the second sub-pixel corresponds to one piece of edge correction data.

3. The method for adjusting the display brightness according to claim 1, wherein a number of bits of the identification data is greater than or equal to 3.

4. The method for adjusting the display brightness according to claim 1, wherein adjusting the display brightness of the display panel based on the mapping table and the identification data comprises:

reading the identification data of the first sub-pixel and the identification data of the second sub-pixel of each pixel;

searching the mapping table for the brightness correction data corresponding to the first codes when the identification data of the first sub-pixel of the pixel and the identification data of the second sub-pixel of the pixel are configured as first codes; and adjusting the display brightness based on the brightness correction data of the first sub-pixel and the second sub-pixel of the pixel.

5. The method for adjusting the display brightness according to claim 1, wherein adjusting the display brightness of the display panel based on the mapping table and the identification data comprises:

reading the identification data of the first sub-pixel and the identification data of the second sub-pixel of the pixel;

searching the mapping table for the edge correction data corresponding to the first code or the second code when the identification data of the first sub-pixel of the pixel is configured as the second code and the identification data of the second sub-pixel of the pixel is configured as the first code or the second code; and adjusting display brightness of the first sub-pixels and display brightness of the second sub-pixel based on the edge correction data of the pixel.

6. The method for adjusting the display brightness according to claim 1, wherein the edge correction data of the pixel comprises a first edge correction data of the first sub-pixel and a second edge correction data of the second sub-pixel.

7. The method for adjusting the display brightness according to claim 1, further comprising:

for each pixel in the display panel:

setting a plurality of first codes and one second code for a third sub-pixel of the pixel based on the brightness correction data and the edge correction data;

configuring identification data of the third sub-pixel of the pixel as the first code if the pixel is located in the center display area;

configuring the identification data of the third sub-pixel of the pixel as the first code or the second code if the pixel is located in the edge display area; and storing the identification data of the third sub-pixel in the display panel, wherein one first code of the third sub-pixel corresponds to one piece of brightness correction data and one piece of edge correction data; and one second code of the third sub-pixel corresponds to one piece of edge correction data.

8. The method for adjusting the display brightness according to claim 7, wherein adjusting the display brightness of the display panel based on the mapping table and the identification data comprises:

reading the identification data of the first sub-pixel, the identification data of the second sub-pixel, and the identification data of the third sub-pixel of the pixel;

searching the mapping table for brightness correction data corresponding to the first codes when the identification data of the first sub-pixel of the pixel, the identification data of the second sub-pixel of the pixel, and the identification data of the third sub-pixel of the pixel are configured as first codes; and adjusting the display brightness based on the brightness correction data of the first sub-pixel, the second sub-pixel, and the third sub-pixel of the pixel.

9. The method for adjusting the display brightness according to claim 7, wherein adjusting the display brightness of the display panel based on the mapping table and the identification data comprises:

reading the identification data of the first sub-pixel, the identification data of the second sub-pixel, and the identification data of the third sub-pixel of the pixel;

searching the mapping table for the edge correction data corresponding to the first code when the identification data of the first sub-pixel of the pixel is configured as the second code and the identification data of the second sub-pixel of the pixel is configured as the first code; and adjusting display brightness of the first sub-pixel, the second sub-pixel, and the third sub-pixel based on the edge correction data of the pixel.

10. The method for adjusting the display brightness according to claim 7, wherein said adjusting the display brightness of the display panel based on the mapping table and the identification data comprises:

reading the identification data of the first sub-pixel, the identification data of the second sub-pixel, and the identification data of the third sub-pixel of each pixel;

searching the mapping table for edge correction data corresponding to the first code or the second code when the identification data of the first sub-pixel of the pixel and the identification data of the second sub-pixel of the pixel are configured as second codes, and the identification data of the third sub-pixel of the pixel is configured as the first code or the second code; and adjusting display brightness of the first sub-pixel, the second sub-pixel, and the third sub-pixel based on the edge correction data of the pixel.

11. The method for adjusting the display brightness according to claim 7, wherein the edge correction data of each pixel comprises first edge correction data of the first sub-pixel, second edge correction data of the second sub-pixel, and third edge correction data of the third sub-pixel.

12. The method for adjusting the display brightness according to claim 1, wherein a number of bits of the identification data is smaller than a number of bits of the brightness correction data, and is smaller than a number of bits of the edge correction data.

13. The method for adjusting the display brightness according to claim 1, wherein the display panel is a special-shaped display panel.

14. A device for adjusting display brightness, comprising:

a storage medium; and a data processing device, wherein the data processing device comprises a generation circuit, a setting circuit, an identification circuit, and an adjustment circuit;

wherein the generation circuit is configured to generate brightness correction data of each sub-pixel of each pixel in a display panel, and to generate edge correction data of the pixel if the pixel is located in an edge display area;

wherein the setting circuit is configured to set a plurality of first codes for first sub-pixels of each pixel based on the brightness correction data, and to set a plurality of first codes and one second code for second sub-pixels of each pixel based on the brightness correction data and the edge correction data;

wherein the storage medium is configured to store a mapping table comprising the brightness correction data, the edge correction data, the plurality of first codes, and the second code, for each pixel;

wherein the identification circuit is configured to configure identification data of the first sub-pixel of each pixel and identification data of the second sub-pixel of each pixel as the plurality of first codes if the pixel is located in a center display area, and to configure identification data of the first sub-pixel of each pixel as a second code and identification data of the second sub-pixel of each pixel as a first code of the plurality of first codes or the second code if the pixel is located in the edge display area, wherein the storage module is configured to store the identification data of the first sub-pixel and the identification data of the second sub-pixel of each pixel in the display panel; and wherein the adjustment circuit is configured to adjust the display brightness of the display panel based on the mapping table and the identification data.

15. The device for adjusting the display brightness according to claim 14, wherein a number of bits of the identification data is smaller than a number of bits of the brightness correction data, and is smaller than a number of bits of the edge correction data.

* * * * *